US008557749B2

(12) United States Patent
Metzinger et al.

(10) Patent No.: US 8,557,749 B2
(45) Date of Patent: Oct. 15, 2013

(54) WEAR-RESISTANT BODY OF SLIDING MATERIAL OF GRAPHITE AND SYNTHETIC RESIN BINDER

(75) Inventors: Thomas Metzinger, Mayschoss (DE); Adi Woizenko, Köln (DE)

(73) Assignee: SGL Carbon SE, Wiesbaden (DE)

( * ) Notice: Subject to any disclaimer, the term of this patent is extended or adjusted under 35 U.S.C. 154(b) by 1838 days.

(21) Appl. No.: 11/259,892

(22) Filed: Oct. 27, 2005

(65) Prior Publication Data
US 2006/0106152 A1 May 18, 2006

(30) Foreign Application Priority Data

Oct. 27, 2004 (EP) .................................... 04025535

(51) Int. Cl.
*C04B 35/52* (2006.01)
*F16C 33/16* (2006.01)

(52) U.S. Cl.
USPC .......................................... 508/109; 508/100

(58) Field of Classification Search
USPC ................................................ 508/109, 100
See application file for complete search history.

(56) References Cited

U.S. PATENT DOCUMENTS

| 4,076,775 A * | 2/1978 | Hackstein et al. ............. 264/0.5 |
| 4,508,855 A | 4/1985 | Peters |
| 5,373,046 A * | 12/1994 | Okamura et al. ............. 524/413 |
| 6,053,718 A | 4/2000 | Schmidt et al. |
| 6,162,767 A | 12/2000 | Adam |
| 6,258,143 B1 | 7/2001 | Carawan et al. |
| 2001/0025014 A1 | 9/2001 | Vesper et al. |

FOREIGN PATENT DOCUMENTS

| DE | 10128055 A1 * | 3/2002 |
| JP | 06264088 A | 9/1994 |
| JP | 7011282 A | 1/1995 |
| JP | 11117933 | 4/1999 |
| JP | 11246681 A | 9/1999 |

OTHER PUBLICATIONS

Shinichi: "Fabrication of polymeric roller bearing for drying and dyeing apparatus", XP-002317566, STN CA Caesar accession No. 1842, Chemical Abstract Service, May 3, 1999, Columbus, Ohio, US.

* cited by examiner

*Primary Examiner* — Jim Goloboy
(74) *Attorney, Agent, or Firm* — Laurence A. Greenberg; Werner H. Stemer; Ralph E. Locher

(57) ABSTRACT

The invention relates to bodies of sliding material comprising graphite and synthetic resin binder which have improved wear properties and comprise no hygroscopic compounds, such as, for example, phosphates, and in which the graphite filler is composed of a component based on natural graphite and at least one component based on synthetic graphite.

36 Claims, No Drawings

WEAR-RESISTANT BODY OF SLIDING MATERIAL OF GRAPHITE AND SYNTHETIC RESIN BINDER

BACKGROUND OF THE INVENTION

Field of the Invention

The invention relates to bodies of sliding material having improved wear properties of graphite and synthetic resin binder which comprise no hygroscopic compounds, such as, for example, phosphates.

Bodies of sliding material are employed in all cases where at least two machine or apparatus parts touch under a certain pressure and move relative to one another, with the technical object of achieving the lowest possible frictional resistance. During such movements the abrasion arising at the friction surfaces and the heat of friction developed there should reach a minimum. Where adequate lubrication of the parts moving relative to one another is ensured, the choice of suitable materials for the parts that slide against one another presents no difficulties. However, there are also uses where work must be carried out entirely without lubrication and dry running exists. Examples of such uses are shut-off or rotary valves in pumps and compressors.

Bodies of sliding material that comprise substances having an intrinsic lubricity, such as graphite or molybdenum sulfide, are employed for use in these cases. However, the lubricity of most of these dry lubricants reaches a satisfactory level only to the extent that a thin film of moisture, which can be attributed, for example, to the moisture content of the ambient atmosphere, can still build up. If this is also no longer the case, as during operation in very dry air, in intensively dried media, in vacuo, at great heights or at high temperatures, the above-mentioned substances having an intrinsic lubricating action no longer meet the requirements and further measures are necessary.

In these cases, it is known from the prior art to impregnate bodies of sliding material with synthetic resins, such as phenolic or furan resins, polyethylene, polyesters, polyacrylate resins, perfluorinated or partly fluorinated organic polymers, or also with inorganic compounds, such as salts or glasses. See e.g. Robert Paxton "Manufactured Carbon: A Self-Lubricating Material for Mechanical Devices", CRC Press Inc., Florida 1979. Of the inorganic compounds, phosphates and boron compounds are preferably employed.

In addition to the expensive production, however, the comparatively high susceptibility of these ceramic components to fracture manifests itself as a substantial disadvantage in respect of the use as a shut-off or rotary valve in pumps and compressors.

Because of these disadvantages, attempts have been made to develop less brittle sliding materials that are less expensive to produce. The result was bodies of sliding material which comprise carbon or graphite as a filler and synthetic resin as a binder and which are indeed substantially less expensive to produce and considerably less susceptible to fracture, but which remain behind the bodies of sliding material built up from ceramics in respect of their running and wear properties.

EP 915129 discloses a body of sliding material which comprises carbon as a filler and synthetic resin as a binder and which shows reduced wear due the addition of Zn phosphate. However, the addition of hygroscopic compounds, such as, for example, phosphates, also involves various complications in the production of bodies of sliding material comprising synthetic resin as a binder, which can be solved in production terms only with a high expenditure. Furthermore, the costs alone of the chemicals added prove to be prohibitive for commercial use of the invention disclosed. In addition, the improvement in wear characteristics achieved by the addition of Zn phosphate no longer exists in its full scope specifically in the event of higher requirements in respect of peripheral speed and pressures.

The life of a shut-off valve is chiefly determined by crater wear and radial wear. Under radial wear (width wear), the width of the shut-off valve decreases. Crater wear (thickness wear) describes the wear which leads to a decrease in the thickness of the shut-off valve. Due to axial wear, the height of the shut-off valve decreases (height wear). However, this effect as a rule occurs to only a small extent during running-in of the pump.

SUMMARY OF THE INVENTION

The invention on which this patent application is based therefore had the object of improving the sliding and wear properties of bodies of sliding material that comprise a carbon filler and synthetic resin as a binder in respect of thickness wear and width wear and of providing processes by which the improved bodies of sliding material can be produced with a low expenditure, in particular without the addition of hygroscopic compounds, such as, for example, phosphates.

It has been found, surprisingly, that a filler combination of a component based on natural graphite and at least one further component based on synthetic graphite produces the desired product features. The component based on natural graphite ensures a low width wear, while the at least one component based on synthetic graphite reduces the thickness wear. The first part of the object is achieved with the features of the characterizing part of patent claim 1, and the second part of the object is achieved with the features of the characterizing parts of patent claim 8 and the following patent claims.

A body, according to the invention, of sliding material comprising graphite and synthetic resin binder is characterized in that the graphite filler is composed of a component based on natural graphite and at least one further component prepared synthetically.

The filler component based on natural graphite can be made of purified natural graphite, expanded natural graphite or processed graphite film and is contained in the body of sliding material in the proportion of 20 to 40 percent by weight, while for the filler component based on synthetic graphite the body of sliding material comprises one of the following substances in the proportion of 20 to 50 percent by weight: electrographite or petroleum coke, coal-tar pitch coke or carbon black coke, the last three substances mentioned being used in graphitized form.

According to a preferred embodiment of this invention, two components based on synthetic graphite are employed simultaneously. These are electrographite and graphitized carbon black coke, contained in the body of sliding material in the proportion in each case of 15 to 30 percent by weight, in addition to the natural graphite component.

A common feature of all the filler components of graphite is that they are finely particulate to dust-like, i.e. their maximum particle size is not larger than 3 mm. However, the individual particle fractions of a composition can have a fineness and particle distribution which is different in each case and adjusted to particular purposes.

In addition to the graphite fillers, a carbon filler can be added, which above all improves the mechanical properties of the body of sliding material. Carbon black, mesocarbon microbeads, nanotubes and fullerenes are included in these.

Alongside or in addition to a carbon filler, the body can also comprise further fillers which are known per se to the person skilled in the art and influence the running properties of the body of sliding material, such as, for example, silicon dioxide, silicon carbide, aluminium oxide, talc and magnesium oxide. These substances either have a certain capacity for sliding themselves, or have an abrasive action to a limited extent and, during operation of the bodies of sliding material, serve to clean the running surfaces from undesirable films which have formed from the material removed from the counter-running materials, where appropriate in interaction with substances taken up from the ambient atmosphere.

All the fillers, namely graphite fillers, carbon fillers and fillers not made of carbon, are coated with a resin binder on their surfaces in the body of sliding material, and the resin binder also forms the matrix which fills up the intermediate spaces between the particles in the body of sliding material substantially without pores. The maximum operational temperature of the bodies according to the invention of sliding material is therefore determined by the upper operational temperature limit for the resins employed. Synthetic resins are preferably used as the binder, such as, for example, phenolic, furan, epoxy, polyester and cyanate ester resins, or also thermoplastics having a high glass-transition temperature, which also optionally have a certain sliding action (polyimides, fluoropolymers, such as PVDF, polyphenylene sulfide). For the applications of the bodies of sliding material under normal operating conditions, phenolic and/or furan resins are preferably employed because of their favourable cost-performance ratio. Phenolic resins of the novolak type, to which substances that cleave formaldehyde, such as e.g. hexamethylenetetramine, are added for curing, are particularly preferred. The use of natural resins or modified natural resins as a binder is possible, but the synthetic resins can be adjusted better to the particular requirements and are therefore predominantly used. The content of binder resin in the body of sliding material is preferably in the range of 20 to 40 percent by weight.

In a preferred embodiment, the body of sliding material comprises several horizontal layers, each of which comprises only one of the two filler components based on graphite. In this context, the layers having a filler component based on natural graphite alternate with the layers having at least one filler component based on synthetic graphite.

In the simplest case, a body according to the invention of sliding material comprises in each case one layer comprising a filler component based on natural graphite and a layer comprising at least one filler component based on synthetic graphite. In cases where a body of sliding material according to the invention comprises an uneven number of layers, the two outer layers preferably comprise the at least one filler component based on synthetic graphite. In the case of an even number of layers, the shut-off valve must be inserted into the slot of the rotor so that the layer which comprises the at least one filler component based on synthetic graphite lies against the side facing away from the direction of rotation of the rotor.

The thickness of the individual layers and the composition thereof are to be coordinated to one another so that a different linear expansion of the individual layers under the action of heat is avoided.

Bodies according to the invention of sliding material are produced by mixing the dry components with the binder resin, preparation of granules or a powder suitable for shaping from the mixture, which is preferably effected by comminution and classifying, shaping by hot pressing in stamping or isostatic presses, extruding by means of, for example, extrusion, transfer moulding or injection moulding, optionally followed by heat treatment of the shaped bodies obtained in order to cure the binder resin completely. This can be followed by mechanical dimensioning.

This general process path can substantially be realized by two variants.

When operating according to the first variant, the filler components made of graphite, optionally a carbon filler and at least one filler which is not made of carbon are mixed with one another, without the addition of a binder, until a uniform distribution of the components is achieved, the dry mixture is then mixed with a synthetic resin binder and the mixture obtained in this way is then processed to a shaped body by one of the procedures described above or below.

When operating according to the second variant, the filler components made of graphite, optionally a carbon filler and at least one filler which is not made of carbon and a binder of synthetic resin are mixed with one another according to the given composition until a uniform distribution of the components is achieved, and the mixture obtained in this way is then processed to a shaped body with the aid of a shaping device by one of the procedures described above or below.

To produce a layered body of sliding material, the two process variants are varied in that in each case only the natural graphite component or the at least one synthetic graphite component is mixed with the further constituents of the composition.

In the processes for the production of the bodies of sliding material, components which are used for composing the mixtures, namely filler components made of graphite, the further filler which is optionally to be added and the particular resin binders, are the substances listed above in the description of the composition of the bodies of sliding material, according to the particular recipe specifications and with adjustment to the particular use requirements.

In carrying out the processes, the binder resin can be added to the solid components either in powder form or in a paste-like, liquid or dissolved form or in the form of a slurry, and can then be further processed together with the solid content. The binder resin can also be mixed with the dry components at a temperature which lies above the melting range or the glass-transition temperature of the particular resin used or the particular resin mixture used, as well as at room temperature.

Some preferred process variants for the production of bodies according to the invention of sliding material are described in the following.

According to a first preferred variant, the dry components, that is to say the filler components made of graphite and the further fillers which are optionally to be added, and the binder resin in powder form are mixed in a mixer in a first process step until a uniform distribution of the components is achieved. The mixture is then mixed in a heated mixing unit which has a high kneading action, for example a roll mixer or calender, at a temperature which lies above the softening range of the binder resin, during which the binder resin is melted. The hot mixture is discharged in the form of a web or milled sheet and, after cooling, is broken and ground. The latter can be carried out, for example, on a pinned or toothed disc mill. The grinding unit is adjusted for this such that on comminution and subsequent sieving, a ground and sieved material having the following particle composition is obtained: 40 to 60% 1 to 2 mm, up to 30% larger than 2 mm and up to 30% larger than 600 μm up to 1 mm. The fine content of smaller than or equal to 600 μm is separated off during sieving and fed back to the kneading process. This ground material is pressed to shaped bodies by hot pressing, injection moulding or transfer moulding. The shaped bodies obtained in this way are then heat-treated at temperatures of from 160° C. to 250° C. for crosslinking of the binder, in order to give either bodies according to the invention of sliding material or precursor product bodies, from which bodies of sliding material can be produced by mechanical working.

According to a sub-variant of the process, the ground material obtained after the comminuting step can be comminuted further by grinding until a fineness of d50% approximately 40 μm is achieved, or a particle fraction of this fineness is produced by classifying after the grinding. This fine particle fraction is then pressed to shaped bodies in a stamping press with a heatable female mould or an isostatic press which is suitable for hot pressing, under such a temperature programme in which the resin binder first melts, but then cures. Temperatures of from 160 to 200° C. are preferably used here. If necessary, the shaped bodies obtained in this way must still be heat-treated for complete curing of the binder resin after removal from the mould. According to a further variant, based on the entirety of the components initially introduced, 5 to 20 percent by weight of a solvent which is capable of dissolving the resin binder is added to the starting substances poured together in a mixer according to the composition, namely the filler components made of graphite, the further fillers which are optionally to be added and binder resin. If phenolic resins are used, approx. 10 wt. % ethanol is preferably used for this. The mixture is then first mixed, if necessary with gentle heating, until an adequate homogeneity is achieved. During this, the surface of all the solid particles which is accessible to liquid is coated with a thin layer of the binder resin solution. Thereafter, by increasing the temperature in the mixture, with further mixing, the solvent is evaporated off until the mixture breaks up and is present as a clod-like to granular mass. After being discharged from the mixer, the mass is classified, optionally after a comminution step. Preferably, the contents having particle sizes above 0.6 mm are processed by injection moulding or transfer moulding and the remaining fine contents are processed by hot pressing to give shaped bodies, which may still have to be heat-treated for final crosslinking of the binder resin in order to arrive at finished bodies of sliding material.

According to a further preferred variant of the process, all the components of the mixture, including the finely powdered binder, are mixed in a mixer until the mixture is completely uniform. After being discharged, the powder is pressed to a preform at room temperature in the female mould of a stamping press or in another suitable pressing device under less than 10 bar.

These preforms are then transferred into the heatable pressing mould of a stamping press or into the mould container of a heated isostatic press and pressed there to a shaped body at a temperature at which the binder resin is in liquid form. Thereafter, the shaped bodies obtained must still be heat-treated at a temperature of 130 to 250° C., if appropriate, for complete crosslinking of the resin binder.

A variation of this process for the production of layered bodies of sliding material comprises mixing in the first step only a filler component based on natural graphite or at least one filler component based on synthetic graphite and further components of the mixture, including the finely powdered binder. For production of a layered body of sliding material, the preforms, which comprise only a filler component based on natural graphite or at least one filler component based on synthetic graphite, are then pressed separately from one another at room temperature. These preforms are stacked horizontally on one another in alternation, in the case of an uneven number of layers the two outer layers preferably comprising the filler component based on synthetic graphite. This stack is then transferred into the heatable pressing mould of a stamping press or into the mould container of a heated isostatic press and pressed there to a shaped body at a temperature at which the binder resin is in liquid form, and, finally, heat treatment is carried out if required.

Layered bodies of sliding material can also be produced by introducing mixtures which only comprise a filler component based on natural graphite or at least one filler component based on synthetic graphite and further components of the mixture in alternation into the female mould of a stamping press or into another suitable pressing device at room temperature, in the case of an uneven number of layers the two outer layers preferably comprising the at least one filler component based on synthetic graphite, and subsequently pressing a layered preform from these layers.

This preform is then transferred into the heatable pressing mould of a stamping press or into the mould container of a heated isostatic press and pressed there to a shaped body at a temperature at which the binder resin is in liquid form, and, finally, heat treatment is carried out if required.

In a further variant for the production of layered bodies of sliding material, the mixtures which only comprise a filler component based on natural graphite or at least one filler component based on synthetic graphite and further components of the mixture are introduced in alternation into the female mould of a stamping press or into another suitable pressing device at room temperature and the layer introduced is pressed immediately, in the case of an uneven number of layers the two outer layers preferably comprising the at least one filler component based on synthetic graphite.

Layered preforms produced in this way are then transferred into the heatable pressing mould of a stamping press or into the mould container of a heated isostatic press and pressed there to shaped bodies at a temperature at which the binder resin is in liquid form, and these are then heat-treated if required.

According to another variant for the production of layered bodies of sliding material, the mixtures which only comprise a filler component based on natural graphite or at least one filler component based on synthetic graphite and further components of the mixture are extruded to strips separately from one another at a temperature that lies above the softening range of the binder resin. Preforms are cut out of these strips and are then stacked horizontally on one another in alternation in a heatable pressing mould of a stamping press or in the mould container of a heated isostatic press, in the case of an uneven number of layers the two outer pieces preferably comprising the filler component based on synthetic graphite. The stack obtained in this way is subsequently pressed there to a shaped body at a temperature at which the binder resin is in liquid form, and, finally, heat treatment is carried out if required.

DESCRIPTION OF THE PREFERRED EMBODIMENTS

The invention is explained further in the following with the aid of embodiment examples:

EXAMPLE 1

32 parts by weight of natural graphite of particle size d50%=19 μm, in each case 16 parts by weight of electrographite of particle size d50%=24 μm and graphitized carbon black coke of particle size d50%=18 μm and, as a binder, 36 parts by weight of a phenol-novolak/hexamethylenetetramine mixture (content of hexamethylenetetramine: 11 wt. %) of particle size 10%>45 μm in an amount in total of 15 kg were mixed intensively in a ploughshare mixer. The dry material homogenized in this manner was then pressed at room temperature on a stamping press in a female mould (manufacturer: Bussmann, type HPK 60) under a pressure of 18 MPa to give a preform having the dimensions 150×200×12 mm³. After removal from the stamping press, the preform produced in this way was transferred into a mould of a hot press corresponding to the external dimensions of the body and pressed there again at a temperature of 180° C. under a pressure of 20 MPa for 15 minutes. During this operation the binder was melted and substantially cured. After removal from the hot press, the body was transferred into a heat treatment oven and after-treated there at 180° C. for 38 hours for postcuring of the binder. After removal of the body from the oven and cooling, shut-off valves having the dimensions 95×43×4 mm³ were produced from the body by known mechanical working processes.

EXAMPLE 2

Two graphite mixtures were intensively mixed separately from one another with in each case 36 parts by weight of a phenol-novolak/hexamethylenetetramine mixture (content of hexamethylenetetramine: 11 wt. %) of particle size 10%>45 μm in an amount in each case of 15 kg in a ploughshare mixer. one mixture comprised 64 parts by weight of natural graphite of particle size d50%=19 μm, while the other mixture comprised 32 parts by weight each of electrographite of particle size d50%=24 μm and graphitized carbon black coke of particle size d50%=18 μm. The homogenized dry mixtures were then pressed separately from one another at room temperature on a stamping press in a female mould (manufacturer: Bussmann, type HPK 60) under a pressure of 18 MPa to give preforms having the dimensions 150×200×5 mm³. After removal from the pressing mould, one preform comprising the filler components based on synthetic graphite was laid into a mould of a hot press corresponding to the external dimensions of the body. A preform comprising the filler component based on natural graphite was stacked on top of this, followed by a further preform which comprised the filler components based on synthetic graphite. This stack of three preforms was pressed in the hot press at a temperature of 180° C. under a pressure of 20 MPa for 20 minutes. During this operation, the binder was melted and substantially cured. After removal from the hot press, the shaped body was transferred into a heat treatment oven and after-treated there at 180° C. for 38 hours for postcuring of the binder. After removal of the body from the oven and cooling, shut-off valves having the dimensions 95×43×4 mm³ were produced from the shaped body by known mechanical working processes.

COMPARATIVE EXAMPLE 1

For comparison, 64 parts by weight of natural graphite of particle size d50%=19 μm were mixed with 36 parts by weight of a phenol-novolak/hexamethylenetetramine mixture (content of hexamethylenetetramine: 11 wt. %) and shut-off valves having the dimensions 95×43×4 mm³ were produced therefrom as described in Example 1.

COMPARATIVE EXAMPLE 2

For comparison, 64 parts by weight of synthetic graphite with a content in each case of 32 parts by weight of electrographite of particle size d50%=24 μm and graphitized carbon black coke of particle size d50%=18 μm were mixed with 36 parts by weight of a phenol-novolak/hexamethylenetetramine mixture (content of hexamethylenetetramine: 11 wt. %) and shut-off valves having the dimensions 95×43×4 mm³ were produced therefrom as described in Example 1.

COMPARATIVE EXAMPLE 3

Analogously to Comparative Example 1, 57 parts by weight of natural graphite of particle size d50%=19 μm were mixed with 7 parts by weight of zinc phosphate of particle size d50%=7 μm and 36 parts by weight of a phenol-novolak/hexamethylenetetramine mixture (content of hexamethylenetetramine: 11 wt. %) and shut-off valves having the dimensions 95×43×4 mm³ were produced therefrom.

COMPARATIVE EXAMPLE 4

Analogously to Comparative Example 2, 57 parts by weight of synthetic graphite with a content in each case of 28.5 parts by weight of electrographite of particle size d50%=24 μm and graphitized carbon black coke of particle size d50%=18 μm were mixed with 7 parts by weight of zinc phosphate of particle size d50%=7 μm and with 36 parts by weight of a phenol-novolak/hexamethylenetetramine mixture (content of hexamethylenetetramine: 11 wt. %) and shut-off valves having the dimensions 95×43×4 mm³ were produced therefrom.

The shut-off valves produced in this way were tested in dry air on a multiple cell compressor from "Gebrüder Becker", type 4.40. The machines were loaded with 800 mbar (overpressure). The peripheral speed was 14 m/s. Loading under overpressure subjects shut-off valves to more stress than loading under vacuum and is therefore more conclusive than the latter.

The measurement values obtained in these tests are summarized in Table 1.

TABLE 1

|  | Width wear μm/100 h | Thickness wear μm/100 h |
|---|---|---|
| Example 1 | 271 | 13.1 |
| Example 2 | 257 | 12.5 |
| Comparative Example 1 | 269 | 21.9 |
| Comparative Example 2 | 1,535 | 7.0 |
| Comparative Example 3 | 290 | 19.4 |
| Comparative Example 4 | 1,540 | 6.9 |

Comparison of the measurement values reproduced in Table 1 clearly shows that the shut-off valves according to the invention have improved wear properties. These are most pronounced in the shut-off valves according to the invention built up from layers, as in Example 2. It can also be clearly seen with the aid of Table 1 that the improvements in width wear are to be attributed above all to the filler component based on natural graphite, while the thickness wear is achieved by the filler component based on synthetic graphite. A width wear which is even also below that of the shut-off valves according to Comparative Example 1, which comprise exclusively the filler component based on natural graphite, is surprisingly achieved here in the shut-off valves according to the invention.

Comparison of Comparative Examples 1 and 2 with Comparative Examples 3 and 4 moreover shows that only an insignificant improvement in the wear properties of conventional shut-off valves is achieved by addition of zinc phosphate.

The inventive solution has the following advantages:

Bodies of sliding material for use under dry running conditions having considerably improved wear properties are provided.

The bodies of sliding material can be produced without addition of hygroscopic compounds, such as, for example, phosphates.

The bodies according to the invention of sliding material can be produced by means of various known production processes. Shaping is also possible by injection moulding and transfer moulding.

We claim:

1. A sliding body, comprising:
   a first component of the sliding body based on natural graphite having a proportion of 20 to 40 percent by weight;
   a second component of the sliding body based on synthetic graphite having a proportion of 20 to 50 percent by weight;
   no hygroscopic compounds, including phosphates, being added;
   a synthetic resin binder;
   at least one of:
      said first component containing only said natural graphite and a synthetic resin binder; and
      said second component containing only said synthetic graphite and said synthetic resin binder; and
   wherein:
   said natural graphite is selected from the group consisting of purified natural graphite, expanded natural graphite and processed graphite foil; and
   said synthetic graphite is selected from the group consisting of electrographite, petroleum coke in graphitized form, coal-tar pitch coke in graphitized form and carbon black coke in graphitized form.

2. A sliding body, comprising:
   a first component of the sliding body based on natural graphite having a proportion of 20 to 40 percent by weight;
   a second component of the sliding body based on synthetic graphite having a proportion of 20 to 50 percent by weight;
   no hygroscopic compounds, including phosphates, being added;
   a synthetic resin binder;
   at least one of:
      said first component containing only said natural graphite and a synthetic resin binder; and
      said second component containing only said synthetic graphite and said synthetic resin binder; and
   wherein:
   said natural graphite is selected from the group consisting of purified natural graphite, expanded natural graphite and processed graphite foil; and
   said synthetic graphite includes two components based on synthetic graphite electrographite and graphitized carbon black coke in a proportion in each case of 15 to 30 percent by weight.

3. A sliding body, comprising:
   a first component of the sliding body based on natural graphite having a proportion of 20 to 40 percent by weight;
   a second component of the sliding body based on synthetic graphite having a proportion of 20 to 50 percent by weight;
   no hygroscopic compounds, including phosphates, being added;
   a synthetic resin binder;
   several horizontal layers containing, in alternation, either said first component based on said natural graphite or said second component based on said synthetic graphite, and in a case of an uneven number of said horizontal layers, both outer layers formed from said second component based on said synthetic graphite; and
   at least one of:
      said first component containing only said natural graphite and a synthetic resin binder; and
      said second component containing only said synthetic graphite and said synthetic resin binder.

4. A sliding body, comprising:
   a first component of the sliding body based on natural graphite having a proportion of 20 to 40 percent by weight;
   a second component of the sliding body based on synthetic graphite having a proportion of 20 to 50 percent by weight;
   no hygroscopic compounds, including phosphates, being added;
   a synthetic resin binder;
   a carbon filler selected from the group consisting of carbon black, mesocarbon microbeads, nanotubes and fullerenes in a proportion of less than 3 percent by weight; and
   at least one of:
      said first component containing only said natural graphite and a synthetic resin binder; and
   said second component containing only said synthetic graphite and said synthetic resin binder.

5. A sliding body, comprising:
   a first component of the sliding body based on natural graphite having a proportion of 20 to 40 percent by weight;
   a second component of the sliding body based on synthetic graphite having a proportion of 20 to 50 percent by weight;
   no hygroscopic compounds, including phosphates, being added;
   a synthetic resin binder;
   at least one filler not made of carbon and selected from the group consisting of silicon dioxide, silicon carbide, aluminum oxide, talc and magnesium oxide to an extent of less than 3 per cent by weight; and
   at least one of:
      said first component containing only said natural graphite and a synthetic resin binder; and
      said second component containing only said synthetic graphite and said synthetic resin binder.

6. The sliding body according to claim 1, wherein said synthetic resin binder is selected from the group consisting of phenolic resins, furan resins, epoxy resins, polyphenylene sulfide resins and cyanate ester resins to a content of from 20 to 40 percent by weight.

7. A process for producing a sliding body, which comprises the steps of:
   mixing, a first filler component based on natural graphite having a proportion of 20 to 40 percent by weight and at least one second filler component based on synthetic graphite having a proportion of 20 to 50 percent by weight, in particulate or pulverulent form with at least one synthetic resin binder resulting in a mixture, no hygroscopic compounds, including phosphates, being added;
   processing the mixture into a shaped, sliding body by a compacting process under elevated temperature; and at least one of:
said first component containing only said natural graphite and a synthetic resin binder; and
said second component containing only said synthetic graphite and said synthetic resin binder; and
wherein:
said natural graphite is selected from the group consisting of purified natural graphite, expanded natural graphite and processed graphite foil; and
said synthetic graphite is selected from the group consisting of electrographite, petroleum coke in graphitized form, coal-tar pitch coke in graphitized form and carbon black coke in graphitized form.

8. The process according to claim 7, which further comprises:
mixing carbon-containing filler components with one another, without an addition of the synthetic resin binder, until a uniform distribution is achieved and resulting in an initial mixture; and
mixing the initial mixture with the at least one synthetic resin binder.

9. The process according to claim 7, which further comprises carrying out the mixing step with the at least one synthetic resin binder at room temperature.

10. The process according to claim 7, which further comprises carrying out the mixing step with the at least one synthetic resin binder at a temperature which lies above a melting range of the synthetic resin binder.

11. The process according to claim 7, which further comprises adding the at least one synthetic resin binder in powder form.

12. The process according to claim 7, which further comprises adding the synthetic resin binder in a paste-like, liquid, dissolved or slurried form.

13. The process according to claim 7, which further comprises comminuting and classifying the mixture before performing the processing step.

14. The process according to claim 7, which further comprises processing the mixture into the shaped body by injection molding or transfer molding.

15. The process according to claim 7, which further comprises:
pressing the mixture into preforms at room temperature in a stamping or double-belt press under less than 10 bar; and
processing the performs into shaped bodies by hot pressing.

16. The process according to claim 15, which further comprises processing the performs into the shaped bodies by hot pressing in a heatable pressing mold of a stamping press or in a mold container of a heated isostatic press at temperatures which lie above a softening range or a glass-transition temperature and below a decomposition temperature of the synthetic resin binder.

17. The process according to claim 7, which further comprises:
adding a third filler made of carbon selected from the group consisting of carbon black, mesocarbon microbeads, nanotubes and fullerenes; and
adding at least one fourth filler which is not made of carbon and selected from the group consisting of silicon dioxide, silicon carbide, aluminium oxide, talc and magnesium oxide.

18. The process according to claim 7, which further comprises heat-treating the shaped body.

19. The process according to claim 7, which further comprises working the shaped body to a final contour by milling, followed by precision turning, precision grinding, honing and/or polishing.

20. A process for producing a layered sliding body, which comprises the steps of:
mixing a first filler component based on natural graphite having a proportion of 20 to 40 percent by weight in particulate or pulverulent form with at least one binder of synthetic resin until a uniform distribution of components is achieved resulting in a first mixture;
mixing at least one second filler component based on synthetic graphite having a proportion of 20 to 50 percent by weight in particulate or pulverulent form with more of the at least one binder of synthetic resin until a uniform distribution of components is achieved resulting in a second mixture;
no hygroscopic compounds, including phosphates, being added;
processing the first and second mixtures to form a shaped body having an alternating layer sequence of the first mixture and the second mixture using a shaping device under elevated temperature, and in a case of an uneven number of layers, both outer layers being formed of the second filler component based on the synthetic graphite; and
at least one of:
said first mixture containing only said natural graphite and a synthetic resin binder; and
said second mixture containing only said synthetic graphite and said synthetic resin binder; and
wherein:
said natural graphite is selected from the group consisting of purified natural graphite, expanded natural graphite and processed graphite foil; and
said synthetic graphite is selected from the group consisting of electrographite, petroleum coke in graphitized form, coal-tar pitch coke in graphitized form and carbon black coke in graphitized form.

21. The process according to claim 20, which further comprises:
mixing carbon-containing filler components with one another, without an addition of the binder of synthetic resin, until a uniform distribution is achieved and resulting in an initial mixture; and
mixing the initial mixture with the at least one binder of synthetic resin.

22. The process according to claim 20, which further comprises carrying out the mixing step with the at least one binder of synthetic resin at room temperature.

23. The process according to claim 20, which further comprises carrying out the mixing step with the at least one binder of synthetic resin at a temperature which lies above a melting range of the binder of synthetic resin.

24. The process according to claim 20, which further comprises adding the at least one binder of synthetic resin in powder form.

25. The process according to claim 20, which further comprises adding the binder of synthetic resin in a paste-like, liquid, dissolved or slurried form.

26. The process according to claim 20, which further comprises comminuting and classifying the mixture before performing the processing step.

27. The process according to claim 20, which further comprises processing the mixture into the shaped body by injection molding or transfer molding.

28. The process according to claim 20, which further comprises:
  pressing the first and second mixtures into preforms at room temperature in a stamping or double-belt press under less than 10 bar; and
  processing the performs into shaped bodies by hot pressing.

29. The process according to claim 28, which further comprises processing the performs into shaped bodies by hot pressing in a heatable pressing mold of a stamping press or in a mold container of a heated isostatic press at temperatures which lie above a softening range or a glass-transition temperature and below a decomposition temperature of the binder of synthetic resin.

30. The process according to claim 20, which further comprises:
  adding a third filler made of carbon selected from the group consisting of carbon black, mesocarbon microbeads, nanotubes and fullerenes; and
  adding at least one fourth filler which is not made of carbon and selected from the group consisting of silicon dioxide, silicon carbide, aluminum oxide, talc and magnesium oxide.

31. The process according to claim 20, which further comprises heat-treating the shaped body.

32. The process according to claim 20, which further comprises working the shaped body to a final contour by milling, followed by precision turning, precision grinding, honing and/or polishing.

33. The process according to claim 20, which further comprises forming the shaped body having the alternating layer sequence by an alternate introduction of the first and second mixtures, and in each case immediately followed by pressing of a layer just introduced.

34. The process according to claim 20, which further comprises forming the shaped body having the alternating layer sequence by an alternate introduction of the first and second mixtures, followed by a final pressing of all layers introduced.

35. The process according to claim 28, which further comprises:
  pressing the first mixture into first preforms at room temperature in a stamping or double-belt press under less than 10 bar;
  pressing the second mixture into second preforms at room temperature in the stamping or double-belt press under less than 10 bar;
  stacking the first and second performs in alternating layer to form the alternating layer sequence;
  processing the alternating layer sequence of the first and second performs into the shaped body by hot pressing in a heatable pressing mold of a stamping press or in a mold container of a heated isostatic press at temperatures which lie above a softening range or a glass-transition temperature and below a decomposition temperature of the synthetic resin binder.

36. The process according to claim 35, which further comprises:
  extruding the first and second preforms in a form of strips; and
  cutting the strips into appropriate pieces.

* * * * *